(12) United States Patent
Zhou et al.

(10) Patent No.: US 12,001,054 B2
(45) Date of Patent: Jun. 4, 2024

(54) WIDEBAND GRATING COUPLER

(71) Applicant: The Chinese University of Hong Kong, Shatin (CN)

(72) Inventors: Xuetong Zhou, Xingtai (CN); Hon Ki Tsang, Ma On Shan (CN)

(73) Assignee: The Chinese University of Hong Kong, Hong Kong (CN)

( * ) Notice: Subject to any disclaimer, the term of this patent is extended or adjusted under 35 U.S.C. 154(b) by 0 days.

(21) Appl. No.: 17/511,427

(22) Filed: Oct. 26, 2021

(65) Prior Publication Data
US 2022/0137293 A1 May 5, 2022

Related U.S. Application Data

(60) Provisional application No. 63/108,224, filed on Oct. 30, 2020.

(51) Int. Cl.
*G02B 6/124* (2006.01)
*G02B 6/34* (2006.01)
*G02B 6/293* (2006.01)

(52) U.S. Cl.
CPC ............... *G02B 6/124* (2013.01); *G02B 6/34* (2013.01); *G02B 6/29359* (2013.01)

(58) Field of Classification Search
CPC ............. G02B 6/124; G02B 6/34; G02B 6/30
See application file for complete search history.

(56) References Cited

U.S. PATENT DOCUMENTS 6,810,067 B2 * 10/2004 Masood .................. H01S 5/187
372/102

OTHER PUBLICATIONS

Bedford et al., "Bow-Tie Surface-Emitting Lasers", IEEE Photonics Technology Letters, vol. 12, No. 8, Aug. 2000, pp. 948-950.*
Doerr, et al., "Wide Bandwidth Silicon Nitride Grating Coupler," IEEE Photonics Technology Letters, vol. 22, No. 19, pp. 1461-1463 (Oct. 1, 2010).
Cheng, et al., "Broadband focusing grating couplers for suspended-membrane waveguides," Opt. Lett., vol. 37, No. 24, pp. 5181-5183 (2012).
Zhong, et al., "Focusing-curved subwavelength grating couplers for ultra-broadband silicon photonics optical interfaces," Opt Express, vol. 22, 18224-18231 (2014).
Wang, et al., "Design of broadband subwavelength grating couplers with low back reflection," Opt Lett, vol. 40, pp. 4647-4650 (2015).
Cheng, et al., "Increase of the grating coupler bandwidth with a graphene overlay," Applied Physics Letters, vol. 104, 111109, 5 pages (2014).

(Continued)

*Primary Examiner* — Michael P Mooney
(74) *Attorney, Agent, or Firm* — Kilpatrick Townsend & Stockton LLP (57) ABSTRACT

An output coupler can be used to couple multiple channels of light from a semiconductor waveguide to an optical fiber for wavelength division multiplexing. To couple light of a wide bandwidth (e.g., equal to or greater than 100 nm), two symmetrical gratings on two sides of a Fabry Perot cavity is used. The two symmetrical gratings are optimized to both reflect light for a Fabry Perot resonator and couple light out of the semiconductor waveguide.

20 Claims, 8 Drawing Sheets

(56) References Cited

OTHER PUBLICATIONS

Xu, et al., "Colorless grating couplers realized by interleaving dispersion engineered subwavelength structures," Opt Lett, vol. 38, No. 18, pp. 3588-3591 (2013).

Sapra, et al., "Inverse Design and Demonstration of Broadband Grating Couplers," IEEE Journal of Selected Topics in Quantum Electronics, vol. 25, No. 3, pp. 1-7 (2019).

Xiang, et al., "Increasing the Grating Coupler Bandwidth with a High Numerical-Aperture Fiber," 11th International Conference on Group IV Photonics (GFP), Paris, pp. 100-101 (2014).

Utaka, et al., "λ/4-Shifted InGaAsP/InP DFB lasers," Ieee J Quantum Elect, vol. 22, pp. 1042-1051 (1986).

Tong, et al., "Efficient Mode Multiplexer for Few-Mode Fibers Using Integrated Silicon-on-Insulator Waveguide Grating Coupler," IEEE Journal of Quantum Electronics, vol. 56, 8400107, 7 pages (2020).

Tong, et al., "Efficient perfectly vertical grating coupler for multi-core fibers fabricated with 193 nm DUV lithography," Optics Letter, vol. 43, No. 23, pp. 5709-5712 (2018).

Chen, et al., "Wideband subwavelength gratings for coupling between silicon-on-insulator waveguides and optical fibers," Optics Letters, vol. 37, No. 17, pp. 3483-3485 (2012).

Chen, et al., "Apodized Waveguide Grating Couplers for Efficient Coupling to Optical Fibers," IEEE Photonics Technology Letters, vol. 22, No. 15, pp. 1156-1158 (2010).

Chen, et al., "Nanoholes Grating Couplers for Coupling Between Silicon-on-Insulator Waveguides and Optical Fibers," IEEE Photonics Journal, vol. 1, pp. 184-190 (2009).

Zhou, et al., "High Efficiency Multimode Waveguide Grating Coupler for Few-Mode Fibers," IEEE Photonics Journal, vol. 14, No. 4, pp. 1-5, Art No. 6643405, (Aug. 2022).

Zhou, et al., "Optimized shift-pattern overlay for high coupling efficiency waveguide grating couplers," Opt. Lett., vol. 47, No. 15, pp. 3968-3971 (2022).

Zhou, et al., "Photolithography Fabricated Sub-Decibel High-Efficiency Silicon Waveguide Grating Coupler," IEEE Photonics Technology Letters, vol. 35, No. 1, pp. 43-46 (Jan. 1, 2023).

\* cited by examiner

WIDEBAND GRATING COUPLER

CROSS-REFERENCES TO RELATED APPLICATIONS

This application claims priority to U.S. Provisional Application No. 63/108,224, filed on Oct. 30, 2020, the disclosure of which is incorporated by reference in its entirety for all purposes.

BACKGROUND

Optical communication uses light to convey information. Data centers and communication across the Internet rely heavily on optical-fiber communication.

In 2012, Xia Chen et al demonstrated a grating coupler using a subwavelength structure. X. Chen, K. Xu, Z. Z. Cheng, C. K. Y. Fung, and H. K. Tsang, "Wideband subwavelength gratings for coupling between silicon-on-insulator waveguides and optical fibers," Opt. Lett. 37, 3483-3485 (2012). They realized a 1-dB bandwidth of 73 nm with insertion loss of −5.6 dB, a footprint of 510×10 µm, a minimum feature size of 120 nm, and an output angle of 10 degrees.

Also in 2012, Zhenzhou Cheng et al demonstrated a grating coupler by using "fishbone-like" subwavelength structure. Z. Cheng, X. Chen, C. Y. Wong, K. Xu, and H. K. Tsang, "Broadband focusing grating couplers for suspended-membrane waveguides," Opt. Lett. 37, 5181-5183 (2012). They realized a 3-dB bandwidth of 90 nm with insertion loss of −3.5 dB, a footprint of 30×20 µm with minimum feature size of 92 nm, and an output angle of 10 degrees.

In 2013, Xiaochuan Xu et al demonstrated a grating coupler by reducing the period of subwavelength structure. X. Xu, H. Subbaraman, J. Covey, D. Kwong, A. Hosseini, and R. T. Chen, "Colorless grating couplers realized by interleaving dispersion engineered subwavelength structures," Opt Lett 38, 3588-3591 (2013). They realized a 1-dB bandwidth of 70 nm with insertion loss of −5.1 dB, a footprint of 517×13 µm with minimum feature size of 34 nm, and a coupling angle of 10 degrees.

In 2014, Qiuhang Zhong et al demonstrated a grating coupler by using a focusing curved subwavelength structure. Q. Zhong, V. Veerasubramanian, Y. Wang, W. Shi, D. Patel, S. Ghosh, A. Samani, L. Chrostowski, R. Bojko, and D. V. Plant, "Focusing-curved subwavelength grating couplers for ultra-broadband silicon photonics optical interfaces," Opt Express 22, 18224-18231 (2014). They realized a 1-dB bandwidth of 100 nm with insertion loss of −4.7 dB, a footprint of 40×20 µm with minimum feature size of 39 nm, and a coupling angle of 20 degrees.

In 2015, Yun Wang et al demonstrated a grating coupler by using a subwavelength structure, optimized by a particle-swarm algorithm. Y. Wang, W. Shi, X. Wang, Z. Lu, M. Caverley, R. Bojko, L. Chrostowski, and N. A. Jaeger, "Design of broadband subwavelength grating couplers with low back reflection," Opt Lett 40, 4647-4650 (2015). They realized a 1-dB bandwidth of 90 nm with insertion loss of −5.5 dB, a footprint of 45×22 µm with minimum feature size of 36 nm, and a coupling angle of 25 degrees.

In 2019, Neil Sapra et al demonstrated a grating coupler by using an inverse design method. N. V. Sapra, D. Vercruysse, L. Su, K. Y. Yang, J. Skarda, A. Y. Piggott, and J. Vuckovic, "Inverse Design and Demonstration of Broadband Grating Couplers," IEEE Journal of Selected Topics in Quantum Electronics 25, 1-7 (2019). They realized a 3-dB bandwidth of 120 nm, and a 1-dB bandwidth smaller than 90 nm, with insertion loss around −6 dB, a footprint of 215×12 µm with minimum feature size of 100 nm, and a coupling angle of 5 degrees.

With a rapid growth of data traffic, there exists a need for improved optical communication systems and methods. Grating couplers that couple broadband light from a semiconductor waveguide to an optical fiber can help increase optical communication speed.

BRIEF SUMMARY OF THE INVENTION

This application relates to optical communication, and without limitation to a grating coupler for optical communication. In some configurations, a wideband grating coupler is designed with a Fabry Perot cavity in the grating coupler. By using a Fabry Perot cavity in the grating coupler, optical bandwidth can be increased. For example, optical bandwidth (1-dB bandwidth) can be equal to or greater than 100, 110, 125, 130, 150, 160, 165, or 170 nm. Optical bandwidth of grating couplers currently available in commercial foundries have an optical bandwidth of around 30 nm.

In some embodiments, a system for optical communication comprises a waveguide and a coupler. The waveguide has a semiconductor core, wherein the semiconductor core is configured to guide light along a first propagation direction. The coupler comprises a first grating, a second grating, and walls forming an optical cavity between the first grating and the second grating. The coupler is configured to couple light out of the waveguide along a second propagation direction. The second propagation direction is not parallel to the first propagation direction.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

I. Introduction

Today, most internet traffic eventually gets routed to at least one of the many data centers that are connected to the internet. The cumulative traffic in data centers, including traffic that is not routed outside the data center, is typically several times larger than external internet traffic. Hyperscale data centers are handling increasing amounts of data traffic because internet data traffic continues to grow exponentially, with a doubling in total traffic approximately every 18 months. One way to help meet current and future demand is to use wideband wavelength multiplexing for data communications.

Millions of silicon photonics optical transceivers, mostly 100 GbE today but migrating to 400 GbE over the next five years, are being deployed in data centers which serve more than 90% of the global internet traffic. Waveguide grating couplers (WGC) can be used in silicon photonics for coupling light between optical fibers and silicon waveguides. WGC can be used to not limit placement of coupling to an edge of a silicon chip and/or for wafer scale testing for selecting dies before the expensive process of photonic packaging. WGCs do not require facet polishing, they can have lower alignment precision requirements than edge couplers and, in the future, they may be used with spatial division multiplexing using multicore or multimode fibers. Some WGCs can be unsuited for use with wideband wavelength division multiplexing (WDM) because their optical bandwidth is insufficient (e.g., with only about 29 nm 1 dB optical bandwidth). Edge couplers can have over 100 nm optical bandwidth, but being distributed along the one dimensional edge of a planar waveguide, can be unsuited for direct interface with multicore fibers when space constraints limit adding more fiber ports. 100 GbE transceivers today can use four wavelengths in a Local Area Network (LAN) WDM grid (channel spacing of about 4.5 nm), which are supported by current WGC technology. CWDM distributed feedback (DFB) lasers do not need precise temperature control nor precise wavelength registration, and therefore are low-cost and more suitable than dense WDM DFB lasers for massive deployments in short reach intra-datacenter interconnects. For example, for 400 GbE, eight WDM channels (instead of 4 WDM channels in 100 GbE) were specified in some of the recently finalized 400 GbE standards. Further advances towards future 1.6 Tb/s ethernet transceivers may use even more wavelength channels. In some embodiments, a WGC which offers 1 dB optical bandwidths of over 110 nm is described. Such unprecedented wide optical bandwidth WGCs can find applications in future wideband optical transceivers.

Some embodiments disclosed in this description relate to alignment tolerant waveguide grating couplers to facilitate implementation of wideband wavelength multiplexing in high-capacity optical transceivers. Wide optical bandwidth, enabled by certain embodiments, provides for increased number of wavelength channels for carrying more data. Using an increased number of wavelength channels can help meet the demand for increased data traffic.

Certain embodiments of couplers can serve as a wideband optical interface between photonic integrated circuits and optical fiber for use in wavelength-multiplexed, high-capacity optical communication systems (e.g., in data centers). Utilization of a wider bandwidth in wavelength multiplexing is one approach to increase data transmission capacity in wavelength division multiplexed optical communication systems. Photonic integrated circuits are already being deployed in large quantities for optical fiber based optical interconnects in hyperscale data centers. There is a need for wideband grating couplers to enable future low cost and/or higher optical bandwidth wavelength multiplexing transceivers. Some configurations may be used for building optical transceivers for terabit/s data transmission involving the use of more wavelength channels.

Some methods to improve the bandwidth of waveguide grating couplers include reducing the index of the grating region by using low index material, using a subwavelength structure to reduce the effective index, modifying the optical dispersion in the grating region, using inverse designed waveguide grating couplers for wide band operation, and using high numerical aperture optical fibers. In certain embodiments, a wideband grating coupler is made without using the methods listed above.

There is an inverse relationship between optical bandwidth and a length of a grating: the longer the grating, the narrower is the wavelength selectivity of the grating. For example, a longer diffraction grating is used to increase a spectral resolution of a grating spectrometer. For designing a wideband grating coupler, a short grating is desired to have reflectivity for a broad optical bandwidth. Yet for high efficiency coupling, in some embodiments, the short grating (e.g., with a total length approximately equal to a mode-field diameter in the optical fiber core) needs to diffract a high percentage of light from the waveguide. To increase efficiency of the short grating to diffract light from the waveguide, an output grating is formed by designing a Fabry Perot cavity between two Distributed Bragg Reflectors (DBRs), to form an optical resonator. Using a Fabry Perot cavity is a different physical principle for making a wideband output coupler than only using a low index material or a subwavelength structure.

To increase optical power diffracted out of the waveguide, the quality factor of the Fabry Perot cavity is increased (e.g., by increasing reflectivity of the DBRs). Thus in some embodiments, an output coupler is formed by two gratings, a first grating and a second grating, separated by a cavity. The cavity is a Fabry Perot cavity, and the two gratings each provide two functions: (1) to reflect light for the Fabry Perot cavity, and (2) to diffract light to couple light out of the waveguide. In some configurations, the output coupler is center symmetric, with the center line of symmetry being a middle of the Fabry Perot cavity, and the second grating having a similar period spacing as the first grating, just inverted. Near the cavity, the first grating and the second grating form DBRs by having an average optical period equal to the center wavelength of light propagating in the output coupler. Further enhancing the reflectivity of the DBR without adding out of plane diffraction may be accomplished by adding additional first order DBR periods, which use a grating period equal to half the wavelength of light.

A distributed feedback (DFB) laser can have a resonator cavity between two DBR mirrors. However, unlike the quarter-wavelength shifted grating used in DFB lasers, an embodiment of the proposed Fabry Perot resonator grating does not have optical gain and/or uses fewer periods of gratings (e.g., of the order of 10 periods) for forming the DBRs at either side of the cavity. In some embodiments, the number a number of periods is equal to or less than 8, 10, 12, or 15 periods; and/or equal to or greater than 1, 3, or 5 periods. In some embodiments, the first grating has the same number of periods as the second grating (e.g., since there is no gain medium between the reflectors, one reflector is not used as a laser cavity output coupler mirror, having fewer periods/lower reflection than the other reflector). Further, the output coupler is designed for out-of-plane coupling (e.g., using a second order Bragg grating; as opposed to providing purely in-plane reflection with first-order Bragg grating) for optical feedback in the DFB laser. Unlike DFB lasers, the average grating period near the cavity, in some embodiments, is that of a second order DBR, with an average period equal to the center wavelength rather than the half-wavelength of light that is used for the first order DBR for in-plane feedback in DFB lasers.

In certain embodiments, a numerical optimization of the periods of the DBR reflectors is performed to engineer a diffracted mode to match a mode profile of an optical fiber, to increase coupling efficiency of the wideband grating coupler. Carrying out a numerical optimization using a subwavelength structure with a minimum feature size above 150 nm (e.g., to satisfy the design rules for fabrication at a commercial foundry) shows that an optical bandwidth of over 130 nm and 170 nm 1 dB optical bandwidth for orthogonal and angled off-vertical coupling, respectively can be achieved. Thus the optical coupler is designed to have wide bandwidth and good coupling efficiency.

Ortega-MoÑux et al used a zero-order grating coupler (ZGC), in which a periodic structured waveguide operates below the Bragg resonance (i.e., period $\Lambda<0.5\lambda/n_B$, where $n_B$ is the effective index of the fundamental Bloch-Floquet mode propagating in the grating region), hence frustrating diffraction orders. Alejandro Ortega-MoÑux, Shurui Wang, Martin Vachon, Jens H. Schmid, Dan-Xia Xu, Pavel Cheben, and Íñigo Molina-Fernández, "Breaking the Coupling Efficiency-Bandwidth Trade-Off in Surface Grating Couplers Using Zero-Order Radiation," Laser & Photonics Reviews, 15(6): 2000542 (2021). The subwavelength periodic structure behaves as a homogeneous waveguide and enables dispersion engineering of the waveguide for bandwidth optimization. Combining this subwavelength region with a prism enables extraction of light from the waveguide. The prism is tilted to produce a near-Gaussian radiated field, which maximizes the overlap with the fiber mode. The device achieves a coupling efficiency of over 80% to SMF-28 optical fiber, and has a 1-dB bandwidth of over 90 nm. A disadvantage is that the subwavelength region requires fabrication with a minimum feature size of 100 nm.

Khajavi et al used a subwavelength grating (SWG) metamaterial engineering to design a compact silicon-based surface grating antenna design with a compact footprint of 7.6 µm×4.5 µm and a minimum feature size of 120 nm on a 300-nm SOI platform with 1 µm buried oxide. Shahrzad Khajavi, Daniele Melati, Pavel Cheben, Jens H. Schmid, Qiankun Liu, Dan Xia Xu, and Winnie N. Ye "Compact and highly-efficient broadband surface grating antenna on a silicon platform," Optics Express 29(5): 7003-7014 (2021). Their 3D FDTD simulations predict a peak diffraction efficiency of 89% (−0.5 dB) and directionality of 0.94. A broad 1-dB bandwidth of 230 nm in diffraction efficiency is achieved with a central wavelength of 1550 nm. The diffraction angle is 23° from the vertical. However, diffraction is coupled to free space, not into a fiber.

Melati et al used a wafer with 300 nm silicon on 1 µm buried oxide. Daniele Melati, Mohsen Kamandar Dezfouli, Yuri Grinberg, Jens H. Schmid, Ross Cheriton, Siegfried Janz, Pavel Cheben, and Dan-Xia Xu, "Design of compact and efficient silicon photonic micro antennas with perfectly vertical emission," IEEE Journal of Selected Topics in Quantum Electronics 27(1): 1-10 (2020). They used a grating coupler to couple light to an ultra-high numerical aperture fiber with a mode field diameter of 3.2 µm at X, =1550 nm. Two-dimension simulation shows the antenna exhibits a coupling efficiency of more than 81% (−0.9 dB) and a 1-dB bandwidth of almost 158 nm with minimum feature size of 40 nm.

In some embodiments, and in comparison to the above works, the Fabry-Perot cavity enhanced grating coupler can achieve −2.65 dB coupling and 1 dB optical bandwidth of 259 nm for perfectly vertical coupled and −2.86 dB with 1 dB bandwidth of 247 nm for angle coupled ultra-high numerical aperture fiber. Our proposed structure can be fabricated with minimum feature sizes larger than equal to or greater than 100, 150, or 170 nm.

As for the few-mode fiber (FMF), a commonly owned publication demonstrated single-polarization diffraction waveguide gratings with coupling efficiencies into the LP01 mode and LP11 mode of −2.8 dB and −3.88 dB and the measured 3 dB bandwidth of the two modes were 61.2 nm and 59.0 nm Y. Tong, W. Zhou, X. Wu and Hon Ki Tsang "Efficient Mode Multiplexer for Few-Mode Fibers Using Integrated Silicon-on-Insulator Waveguide Grating Coupler," IEEE J. Sel. Top. Quantum Electron. 56, 8400107 (2020), which is incorporated by reference for all purposes. In some embodiments, a FP cavity enhanced FMF grating coupler can achieve −2.93 dB with 1 dB bandwidth 80 nm for FMF.

Commonly owned publication, Y. Tong, X. Zhou, Y. Wang, C. W. Chow, H. K. Tsang, "Bridging the Graded-Index Few-Mode Fibre with Photonic Integrated Circuits via Efficient Diffraction Waveguide Gratings," European Conference on Integrated Optics (ECIO) (2020), is also incorporated by reference for all purposes.

II. Waveguide Grating Coupler (WGC)

One potential drawback of a waveguide grating coupler (WGC) is wavelength dependence of the Bragg diffraction. Thus, WGCs can have a much smaller optical bandwidth than edge couplers. In some embodiments (e.g., for transceivers), a design of a WGC can be constrained to ensure that a minimum feature sizes is compatible with design rules offered by silicon photonics foundries. This can preclude the use of critical feature dimensions below about 160 nm for shallow etched grating slots, making it difficult to manufacture a precise subwavelength engineered structure.

The optical bandwidth $\Delta\lambda_{1\ dB}$ of a conventional waveguide grating coupler is given by:

$$\Delta\lambda_{1dB} = \eta_{1dB}\left|\frac{d\lambda}{d\theta}\right| = \eta_{1dB}\left|\frac{-\Lambda n_c \cos\theta}{1 - \Lambda\frac{dn_{\text{eff}}(\lambda)}{d\lambda}}\right|$$

Here, $\Lambda$ is the period of the grating, which is approximately equal to the optical wavelength (in vacuum) divided by the effective index of the grating region. One way to enhance the optical bandwidth is to use materials with a low refractive index in order to increase $\Lambda$ for a given optical wavelength. Using a subwavelength structure (e.g., a high refractive index material is reduced by etching a transverse subwavelength grating) can also increase optical bandwidths. Subwavelength gratings however are challenging to manufacture in commercial foundries because they typically require feature sizes below those specified in current generation design rules.

Another strategy is to reduce a magnitude of the denominator in the above equation by dispersion engineering of the grating to enhance the optical bandwidth. Adding a higher index overlay in the cladding region can help in this regard. A third strategy to increase optical bandwidth based on the above equation is to increase the first term by using a small core high numerical aperture fiber.

In an interface between multicore optical fibers and photonic integrated circuits (without the use of fiber based photonic lanterns), WGCs may be laid out in a 2 dimensional array that matches positions of different fiber cores in the multicore fiber. Orthogonal grating couplers have the advantage of not using angled polishing of the fiber array, less variations in coupling efficiency across different fiber cores, and/or simpler optical alignment process during photonic packaging. Orthogonal grating couplers are also attractive for hybrid integration of vertical-cavity surface-emitting lasers (VCSELs) on photonic integrated circuits. Various approaches have been proposed to realize a perfectly vertical coupled grating.

III. Resonance-Enhanced Waveguide Grating Coupler for Wideband High Capacity CWDM Transceivers In some embodiments, a Fabry Perot (FP) cavity within a WGC is used as a resonator to build up power within the WGC and enhance the out of plane diffraction over a wide optical bandwidth. In some configurations, the cavity has a high quality factor (Q-factor) so that the resonant optical field amplitudes can build up in the cavity to levels surpassing a relatively low field amplitude that enter the cavity through the high reflectivity mirror (e.g., in order to enhance the out of plane diffraction out of the cavity). The high Q factor cavity can be realized by using high reflectivity mirrors to form the cavity. The mirrors can be formed by placing two distributed Bragg reflectors (DBR) on either side of the cavity. In some embodiments the two DBRs are identical (e.g., they have a same periods, symmetrical about the Fabry Perot cavity). Thus, in some embodiments, a WGC that is symmetric about a central short-cavity Fabry-Perot resonator. Unlike a quarter-wavelength shifted DFB grating for a laser, the central FP cavity is designed to support first order out of plane diffraction (e.g., the Fabry Perot cavity length is approximately equal to the wavelength of light in the cavity rather than the half-wavelength in the quarter-wavelength shifted DFB laser), and the DBR gratings that constitute the FP cavity mirrors near the cavity rely on second order Bragg reflection (e.g., the average grating period of the DBR is approximately equal to the wavelength of light in the grating), rather than the first order Bragg reflection in DFB lasers. The design of the DBR for second-order Bragg reflection is to allow first-order out of plane diffraction from the DBR region to help with mode-matching (e.g., and thus improve coupling efficiency). The number of periods used in each DBR region can be relatively small and sometimes considerably fewer than is used for DFB lasers. A FP WGC is well suited for orthogonal output coupling as the second order Bragg reflection from the DBR on the left side of the cavity will be 180 degrees out of phase with the second order Bragg reflection from the DBR on the right side of the cavity and will be approximately cancelled. The output coupler is also compatible with off-vertical coupling by detuning an average period of the DBR slightly from the wavelength of light in the grating.

IV. Sample Approach

Figure 1:
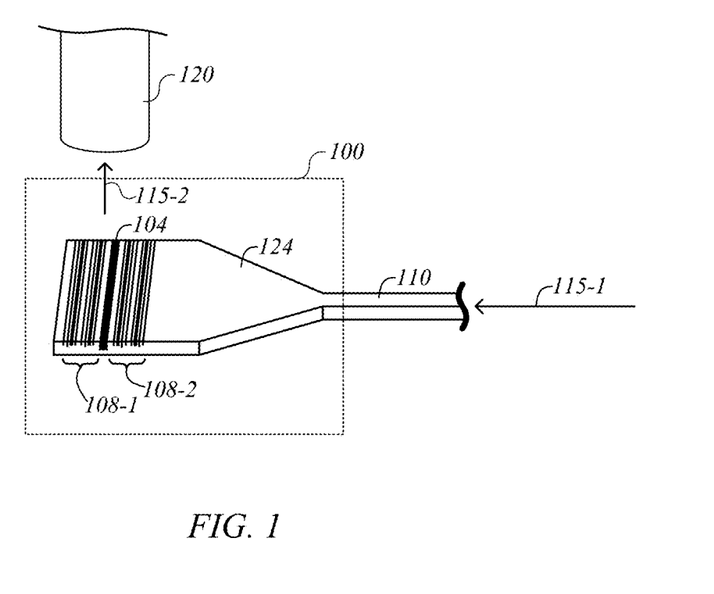
FIG. 1. A simplified perspective view of an embodiment of an output coupler having a Fabry Perot resonator.

Referring first to FIG. 1, a simplified perspective view of an embodiment of an output coupler 100 having an optical cavity 104, a first grating 108-1, and a second grating 108-2 is shown. The optical cavity 104 is between the first grating 108-1 and the second grating 108-2. A waveguide is configured to guide light along a first propagation direction 115-1. For example, the waveguide 110 comprises a semiconductor core (e.g., silicon, InP, or GaAs) and a cladding (e.g., an insulating layer such a silicon dioxide and/or air) that confines light in one or more transverse directions, so that light propagates in a longitudinal direction of the waveguide 110. Light propagating in the first propagation direction 115-1 is directed to the output coupler 100. The output coupler 100 is configured to couple light out of the waveguide 110 along a second propagation direction 115-2. The second propagation direction 115-2 is not parallel to the first propagation direction 115-1. Light traveling in the second propagation direction 115-2 is coupled into an optical fiber 120. The output coupler 100 comprises a taper 124 to expand light before light reaches the first grating 108-1 and the second grating 108-2.

Figure 2:
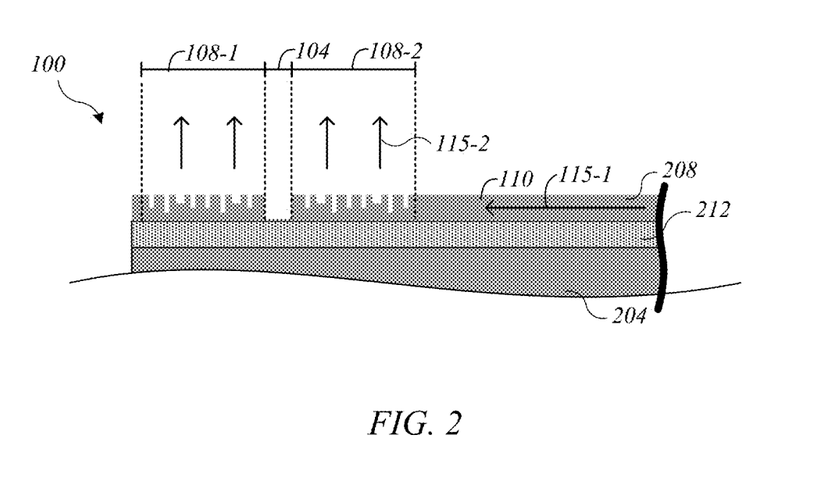
FIG. 2. A simplified cross section view of an embodiment of an output coupler.

FIG. 2 shows a simplified cross section view of an embodiment of the output coupler 100. The optical cavity 104 is a Fabry Perot cavity formed by two identical second order distributed Bragg reflectors, gratings 108, on two sides of the optical cavity 104. To enhance optical power build up inside the optical cavity 104 (e.g., to increase the quality factor of the Fabry Perot cavity), reflectivity of gratings 108 is increased by having an average optical period of gratings 108 equal to a central wavelength of light to be coupled out of the output coupler 100. The first grating 108-1 is symmetrical to the second grating 108-2 in the cross section plane shown. The cross section is in a plane that is parallel to the first propagation direction 115-1, centered in the waveguide 110, and includes a component of the out-coupling direction (i.e., the second propagation direction 115-2).

The optical cavity 104 and gratings 108 are formed by etching a semiconductor material. For example, a silicon-on-insulator (SOI) wafer is used. The SOI wafer comprises a substrate 204, a device layer 208, and an insulating layer 212 between the substrate 204 and the device layer 208. Trenches are etched in the device layer 208 to form walls and/or ridges. The waveguide 110 is formed in the device layer 208. The Fabry Perot cavity is etched to a depth deeper than trenches in the gratings 108. For example, walls of the optical cavity 104 are taller than walls of ridges in the gratings 108 (e.g., walls of the optical cavity are more than twice the height of walls of ridges in the gratings 108). In some embodiments, trenches are of equal depth and/or equal in depth to the optical cavity 104 (e.g., to simplify fabrication). The optical cavity 104 has a width approximately equal to the central wavelength of light to be out-coupled; in some embodiments, the optical cavity 104 has a width less than the central wavelength; in some embodiments, the optical cavity 104 has a width equal to or less than m times the central wavelength, wherein m is equal to 2, 4, 5, 10, or 20.

V. Genetic Optimization

The first grating 108-1 and the second grating 108-2 each have a non-uniform grating period (e.g., to couple light out of the waveguide 110 and/or to increase a bandwidth of the output coupler 100). The non-uniform grating can be designed by using a numerical optimization method, such as genetic optimization, adjoint based optimization, or particle swarm optimization. Numerical optimization is used to design a diffracted mode of the grating 108 to match a mode profile of the optical fiber.

An embodiment of a genetic optimization algorithm includes six steps:
  i. Population initialization
  ii. Fitness evaluation
  iii. Termination criteria
  iv. Selection
  v. Crossover
  vi. Mutation An optimization loop is fed by a randomly perturbed periodic grating. In step i, a population is initialized. An average period equal to the target central wavelength can be used. Each population is a vector of a point in a search space. To take into account the objectives, a fitness is defined as the calculated coupling efficiency multiplied by the 1-dB bandwidth across a desired wavelength band.

In step ii, fitness of the initial population is evaluated and then compared to termination criteria, step iii. If evaluation of the population meets the termination criteria, then the algorithm is exited. If evaluation of the population does not meet the termination criteria in step iii, then the algorithm moves to selection, step iv. After selection, crossover, step v is implemented and then mutation of the population, step vi. After the population is mutated in step vi to form a new population, the algorithm returns to step ii for fitness evaluation of the new population.

As an example, the fitness includes simulations that cover the wavelength range from 1450 nm to 1650 nm. In step iii, termination criteria is met if there has been no improvement to the fitness in the n most recent generations, where n is an integer (e.g., 20, 25, 30, 40, 50). Applicant has found n=30 to be a good compromise between stopping the genetic algorithm and finding an acceptable solution. In step iv, selection, populations are kept using a Roulette-Wheel selection method. In step v, crossover, a crossover function is implemented at an 80% probability to intermix populations with each other. The reproduced populations experience mutations at a 5% probability, step vi, where structural parameters experience random variations. In order to possess a robust fabrication performance, a minimum feature size can be restricted to be above 193 nm DUV lithography, for large-volume manufacturing by the commercial silicon photonics foundries. However, a different minimum feature size could be used as foundries develop and adopt more precise techniques at cost-effective prices.

In some embodiments, initializing the populations with random structural parameters subject is constrained to a feature size above 120 or 150 nm; evaluating the fitness of each population is performed with a two-dimensional finite-difference time-domain simulation; and/or the fitness F is denoted by the coupling efficiency multiplied by the bandwidth of the grating coupler. In some configurations, optimization was for a silicon-on-insulator wafer with 340 nm thick top silicon layer and a 2 μm thick buried-oxide layer. Structural parameters that were optimized include a width of groove and a width of a tooth of every grating period. Etch depths were also optimized to increase the directionality of the structure for upward diffraction (by making use of constructive interference of the upward scattered light from the different layers in the structure, while having destructive interference for the downward scattered light).

To reduce simulation time, an initial optimization steps used 2-dimensional finite-difference time-domain (2-D FDTD) simulations. Due to the central symmetry, only half of the parameters were optimized. The preliminary optimization was carried out for operation in the wavelength range from 1450 to 1700 nm, but the method can be applied to other wavelength ranges such as the O-band for commercial transceiver applications at shorter wavelengths.

VI. Sample Coupling Efficiencies

In some configurations, the output coupler is symmetrical about the central FP cavity. A simulation of an embodiment of the output coupler is for a structure with two second-order non-uniform DBR regions around a central Fabry Perot (FP) cavity. The optical power diffracted by scattering at the cavity mirrors and the DBR periods near the cavity is proportional to the power that is built up in the FP cavity. By engineering the cavity to high Q and numerically optimizing the second-order DBR reflectors for out of plane first order diffraction that mode matches with the optical fiber mode, a high coupling efficiency and wide optical bandwidths can be achieved. Another degree of design freedom from the possibility of adding additional periods of first order DBR reflectors to enhance the FP cavity Q without loss from out of plane diffraction. The second order DBR near the cavity is formed by a grating with an average period equal to the central optical wavelength in the grating region. Each individual grating period may be varied about this average and numerically optimized to maximize the coupling efficiency and optical bandwidth. Some designs for the DBRs have been carried out using a genetic algorithm.

3D-FDTD simulations were carried out to evaluate the performance of different optimized structures for coupling from a 340 nm thick top-silicon SOI wafer to a single-mode fiber aligned normal to the surface, or at 6 degrees off-vertical.

Figure 3:
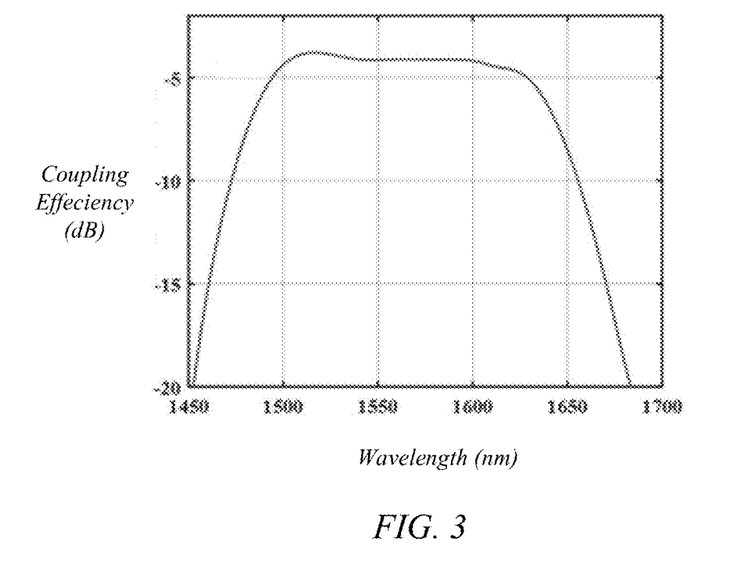
FIG. 3. A chart of simulated coupling efficiency of an embodiment of an output coupler for orthogonal output coupling.

FIG. 3 is a chart of experimental coupling efficiency of an embodiment of an output coupler for orthogonal output coupling. After running a numerical optimization, each period and duty cycle of the DBR grating (e.g., grating 108 in FIG. 2) is obtained for a wideband grating coupler with a Fabry Perot cavity in the center region. 3D FDTD simulations were applied to simulate a couple efficiency of the wideband grating coupler. The simulated result for vertically coupled light (e.g., the second propagation direction 115-2 in FIG. 1 is orthogonal to the first propagation direction 115-1) is shown in FIG. 3. FIG. 3 shows a 1-dB bandwidth up to 130 nm with coupling efficiency of −3.78 dB.

Figure 4:
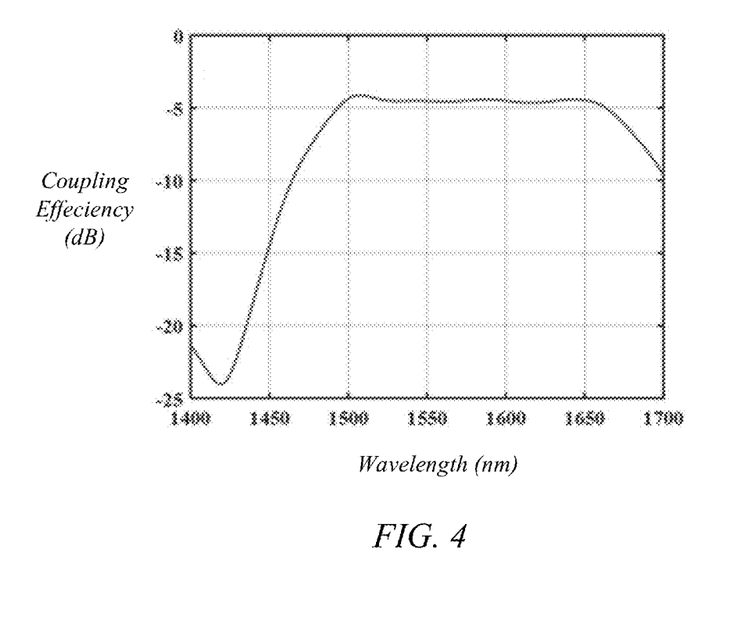
FIG. 4. A chart of simulated coupling efficiency of an embodiment of an output coupler for angled output coupling.

Engineering the DBR design to maximize diffraction for off-vertical is also possible in the optimization procedure. FIG. 4 is a chart of experimental coupling efficiency of an embodiment of an output coupler for angled output coupling. The calculated coupling efficiency for an off-vertical coupling as a function of the wavelength of light is plotted in FIG. 4. FIG. 4 shows up to 173 nm 1-dB bandwidth with a coupling efficiency of −4.14 dB is possible. Higher coupling efficiency is possible with further optimization of layer thickness, such as using polysilicon overlay (e.g., as a top and/or side cladding) on the grating. Both optical bandwidths, shown in FIGS. 3 and 4 surpass waveguide grating coupler bandwidths previously reported.

VII. Sample Output Coupler

Figure 5:
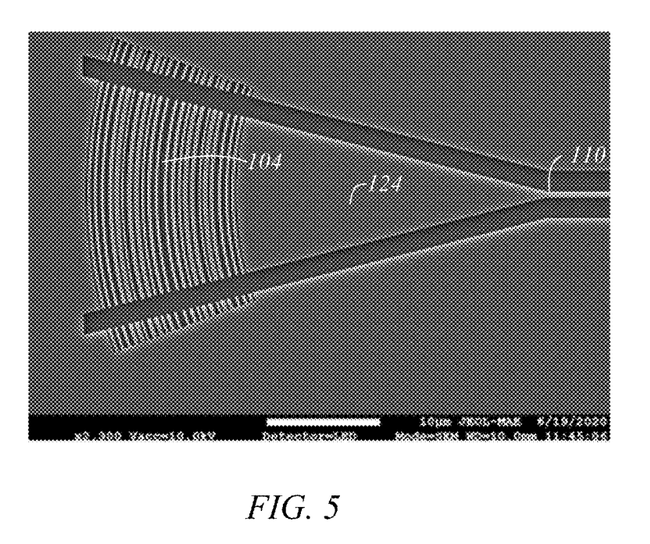
FIG. 5. A top-view image of an embodiment of an output coupler.

FIG. 5 shows a top-view image of a manufactured embodiment of an output coupler. The output coupler shown in FIG. 5 was a test coupler. The layout is a center symmetric wideband grating coupler with a FP cavity 104 in a center region of the output coupler. An optical 1-dB bandwidth, for orthogonal coupling, was measured to be 121 nm (as compared to the 130 nm in the simulation in FIG. 3). The coupling efficiency was −4.6 dB. Thickness of the waveguide was not optimized. Accordingly, coupling efficiency can likely be increased compared to the coupling of the test coupler.

Figure 6:
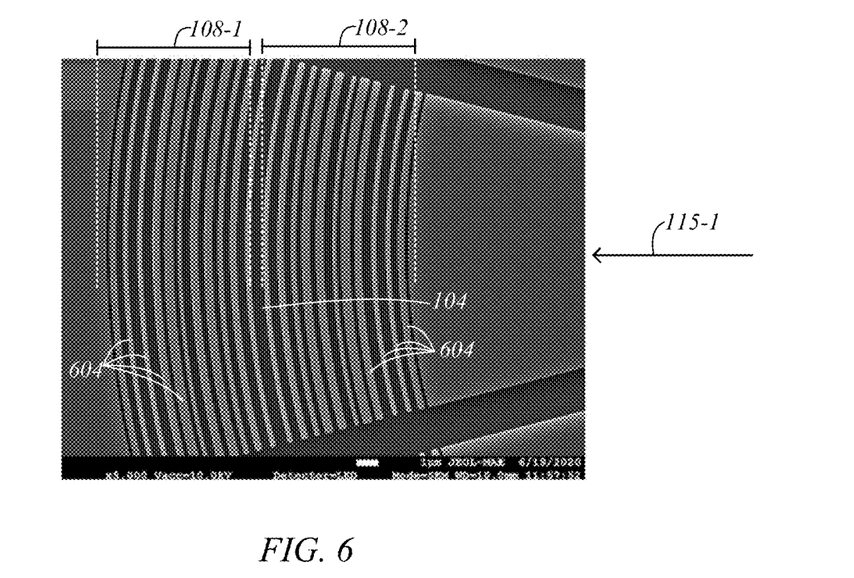
FIG. 6. A top-view image of an embodiment of an output grating.

FIG. 6 shows a zoomed-in, top-view image of the embodiment of the output coupler shown in FIG. 5. Ridges 604 of gratings 108 are shown. The ridges 604 are elongated structures, such that they have a length much longer than their width (e.g., length is 2, 3, 5, 10 times or more then the width). A width of a ridge is measured in a direction of the first propagation direction 115-1. The ridges 604 are curved along a length of the ridges 604. Also, ridges 604 of the first grating 108-1 are longer than ridges of the second grating 108-2.

In FIG. 6, the first grating 108-1 is symmetrical to the second grating 108-2 along a direction of the first propagation direction 115-1. For example, the first grating 108-1 is symmetrical to the second grating 108-2 in a plane along the first propagation direction 115-1 and extending into and out of the page (e.g., the cross section shown in FIG. 2).

VIII. Example Process

Figure 7:
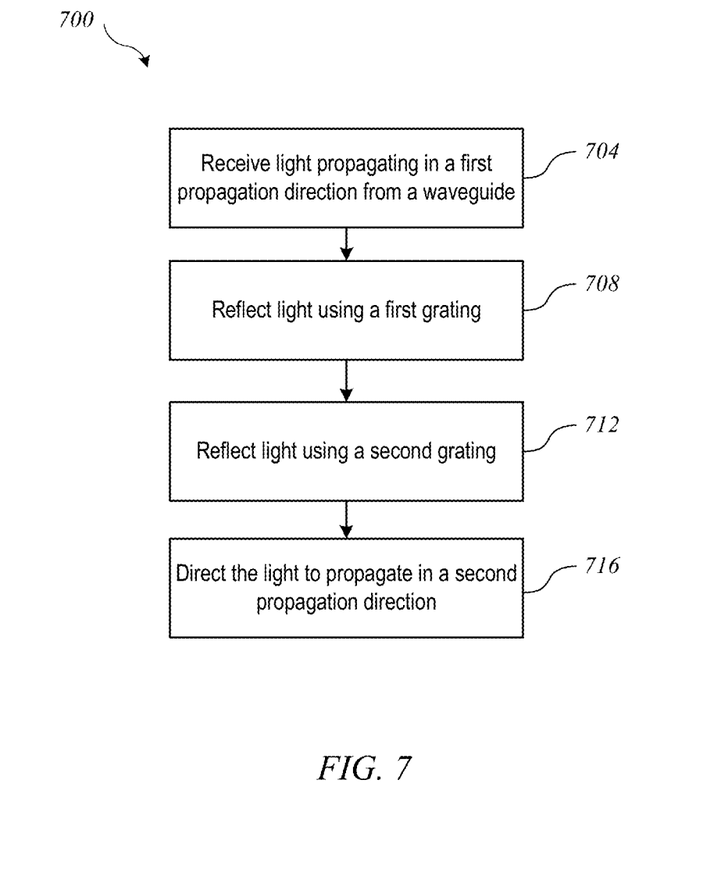
FIG. 7. A flowchart of an embodiment of a method for coupling light out of a waveguide.

FIG. 7 depicts a flowchart of an embodiment of a process 700 for coupling light out of a waveguide. Process 700 begins in step 704 with receiving light from a waveguide. Light in the waveguide (e.g., waveguide 110 in FIG. 1) travels in a first propagation direction (e.g., the first propagation direction 115-1 in FIG. 1). In step 708, light is reflected using a first grating (e.g., the first grating 108-1 in FIG. 1) so that light passes through an optical cavity (e.g., optical cavity 104 in FIG. 1, which is a Fabry Perot cavity). In step 712, light is reflected using a second grating (e.g., second grating 108-2 in FIG. 1), after the light passes through the optical cavity. Light is directed in a second propagation direction (e.g., the second propagation direction 115-2 in FIG. 1), step 716, using the first grating and/or the second grating, wherein the second propagation direction is not parallel with the first propagation direction (e.g., the coupler is an out-of-plane coupler). Light can reflect back and forth between the first grating and the second grating several times before being directed out of the waveguide.

IX. Experiments and Simulations

Figure 8:
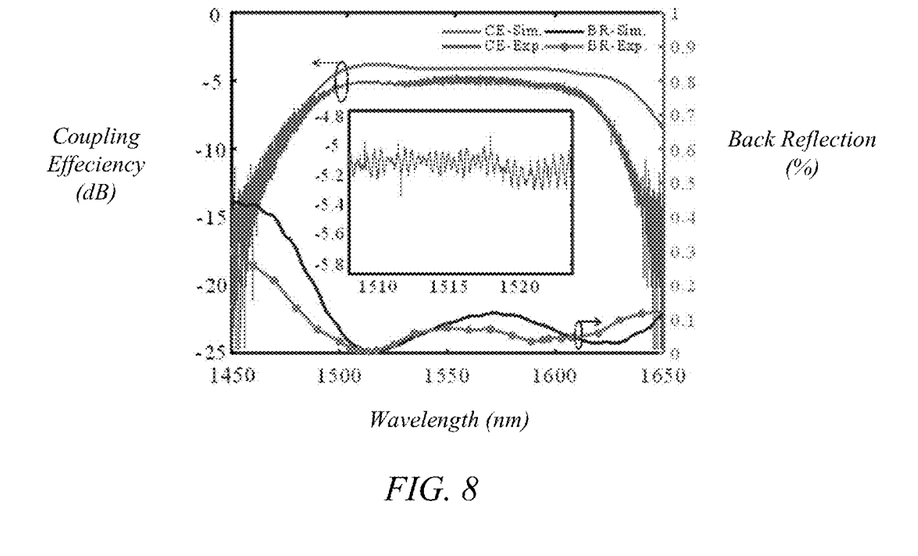
FIG. 8. A chart of experimental results of an embodiment of an output coupler for orthogonal output coupling.

FIG. 8 is a chart of experimental results of an embodiment of an output coupler for orthogonal output coupling from a 340 nm thick top-silicon SOI wafer into a single-mode fiber. For orthogonal output coupling the 1 dB optical bandwidth is about 121 nm.

Figure 9:
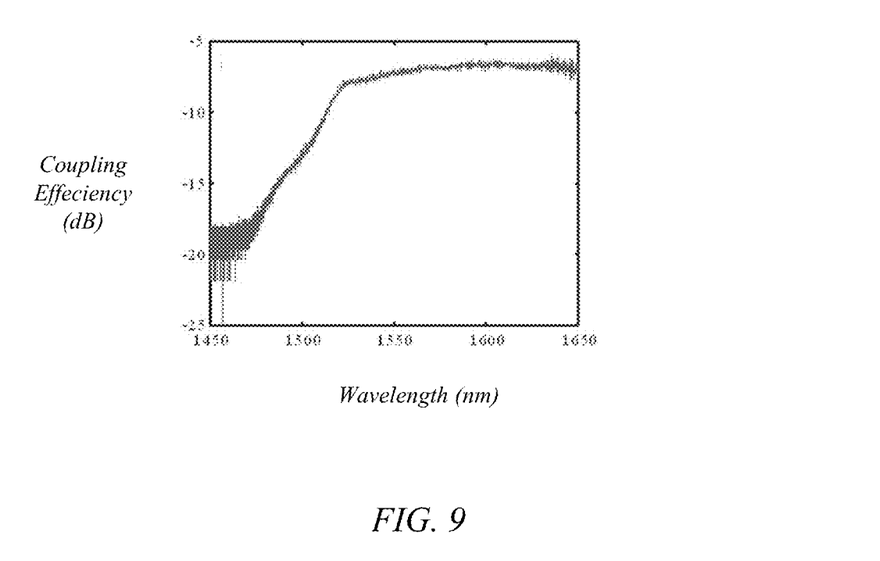
FIG. 9. A chart of experimental results of an embodiment of an output coupler for angled output coupling.

FIG. 9 is a chart of experimental results of an embodiment of an output coupler for angled output coupling from the 340 nm thick top-silicon SOI wafer into the single-mode fiber. For the angled coupling (6 degree off-vertical) the 1 dB optical bandwidth is above 125 nm, which exceeded the limitation of test equipment, which was limited to 1450 to 1650 nm.

Figure 10:
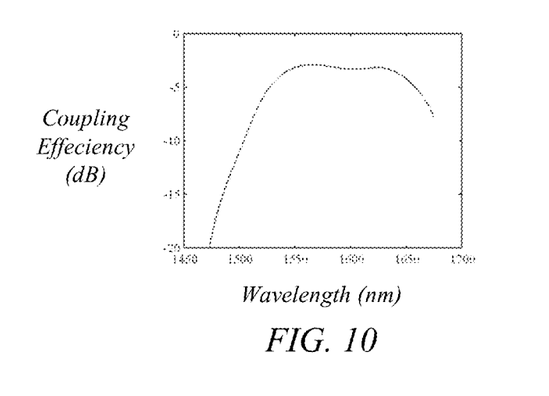
FIG. 10. A chart of simulated coupling efficiency into a single-mode fiber of an embodiment of an output coupler for angled output coupling on a 220 nm thick top-silicon with 160 nm polysilicon overlay SOI wafer.

FIG. 10 is a chart of simulated coupling efficiency into a single-mode fiber of an embodiment of an output coupler. The simulation is from a 3D-FDTD simulation of off-vertical light (6 degrees) into a single-mode fiber from a 220 nm thick top silicon of an SOI wafer with a 160 nm polysilicon overlay. The 1 dB optical bandwidth is about 110 nm with −2.88 dB coupling efficiency.

Figure 11:
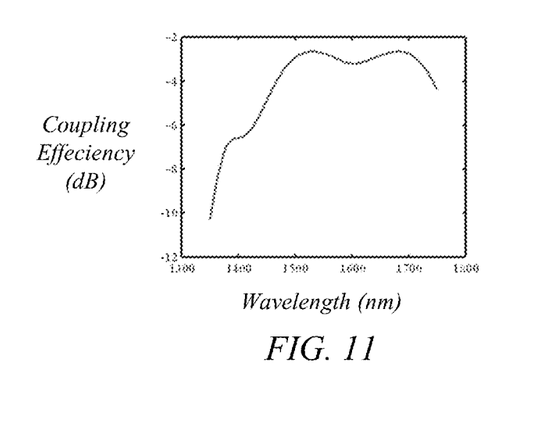
FIG. 11. A chart of simulated coupling efficiency into a high numerical aperture fiber of an embodiment of an output coupler for orthogonal output coupling.

FIG. 11 is a chart of simulated coupling efficiency into a high numerical aperture fiber of an embodiment of an output coupler for orthogonal output coupling. The simulation is from a 3D-FDTD simulation of orthogonal light into a high numerical aperture fiber from a 220 nm thick top silicon of an SOI wafer with a 160 nm polysilicon overlay. The high numerical aperture fiber has a mode field diameter of 3.2 µm at a wavelength of 1550 nm. The 1 dB optical bandwidth is about 259 nm with −2.65 dB coupling efficiency.

Figure 12:
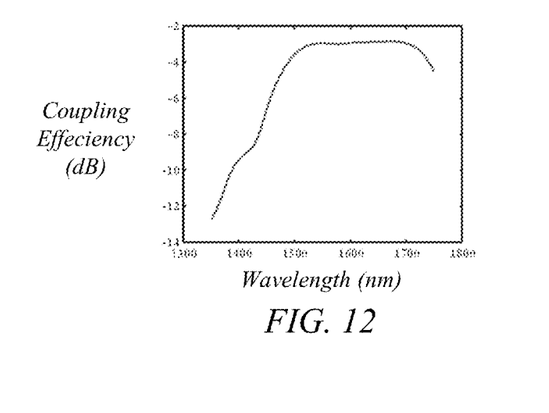
FIG. 12. A chart of simulated coupling efficiency into a high numerical aperture fiber of an embodiment of an output coupler for angled output coupling.

FIG. 12 is a chart of simulated coupling efficiency into a high numerical aperture fiber of an embodiment of an output coupler for angled output coupling (6 degrees off vertical). The simulation is from a 3D-FDTD simulation of off-vertical light into a high numerical aperture fiber from a 220 nm thick top silicon of an SOI wafer with a 160 nm polysilicon overlay. The high numerical aperture fiber has a mode field diameter of 3.2 µm at a wavelength of 1550 nm. The 1 dB optical bandwidth is about 247 nm with −2.86 dB coupling efficiency.

Figure 13:
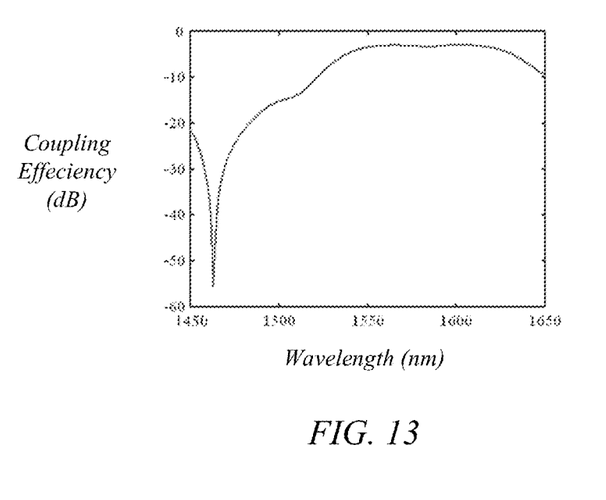
FIG. 13. A chart of simulated coupling efficiency into a few-mode fiber of an embodiment of an output coupler.

FIG. 13 is a chart of simulated coupling efficiency into a few-mode fiber of an embodiment of an output coupler. This simulation is of coupling efficiency of orthogonal light from a 220 nm thick top silicon SOI wafer with a 160 nm overlay coupled into a few mode fiber (FMF). The 1 dB optical bandwidth is about 80 nm with −2.93 dB coupling efficiency.

Figure 14:
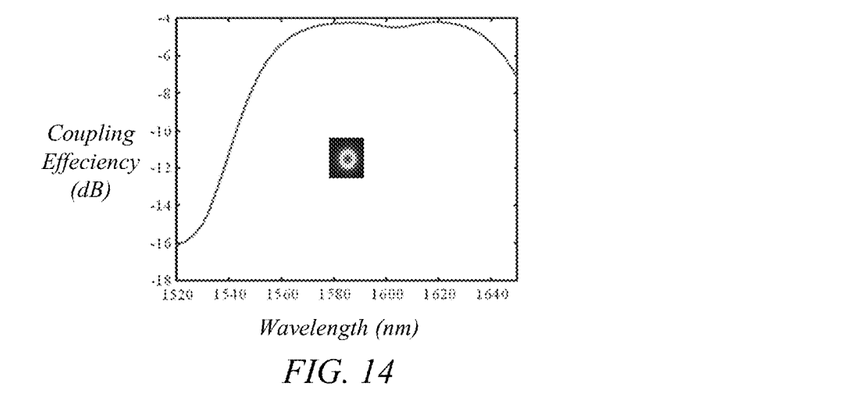
FIG. 14. A chart of simulated coupling efficiency for a TE0 mode of an embodiment of an output coupler.

FIG. 14 is a chart of simulated coupling efficiency for a TE0 mode of an embodiment of an output coupler. The simulation is from a 3D-FDTD simulation of orthogonal light from a 220 nm thick top silicon SOI wafer with a 160 nm polysilicon overlay into an OM4 fiber. The TE0 mode has a 3 dB optical bandwidth of about 100 nm with a coupling efficiency of −4.22 dB.

Figure 15:
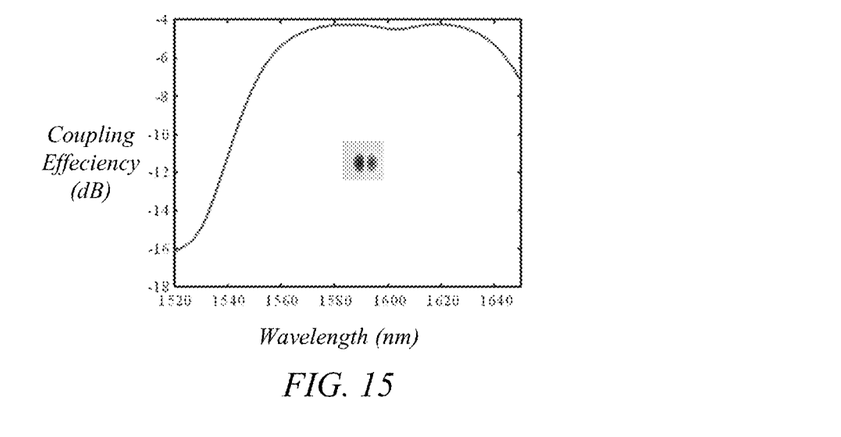
FIG. 15. A chart of simulated coupling efficiency for a TE1 mode of an embodiment of an output coupler.

FIG. 15 is a chart of simulated coupling efficiency for a TE1 mode of an embodiment of an output coupler. The simulation is from a 3D-FDTD simulation of orthogonal light from a 220 nm thick top silicon SOI wafer with a 160 nm polysilicon overlay into an OM4 fiber. The TE1 mode has a 3 dB optical bandwidth of about 100 nm with a coupling efficiency of −4.24 dB.

Figure 16:
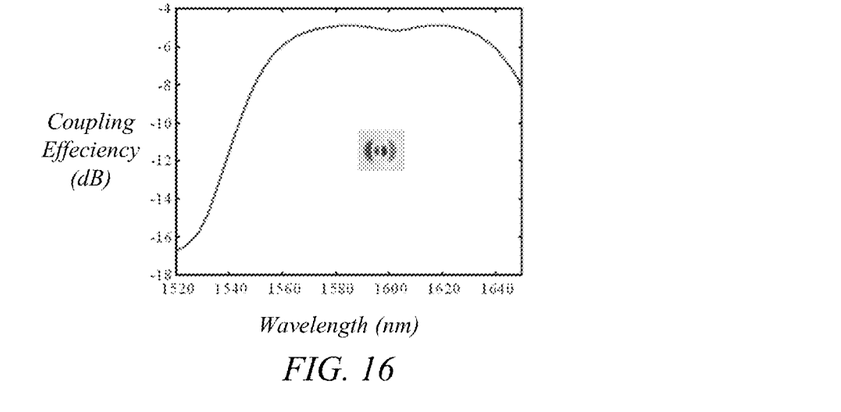
FIG. 16. A chart of simulated coupling efficiency for a TE3 mode of an embodiment of an output coupler.

FIG. 16 is a chart of simulated coupling efficiency for a TE3 mode of an embodiment of an output coupler. The simulation is from a 3D-FDTD simulation of orthogonal light from a 220 nm thick top silicon SOI wafer with a 160 nm polysilicon overlay into an OM4 fiber. The TE1 mode has a 3 dB optical bandwidth of about 100 nm with a coupling efficiency of −4.89 dB.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an", or "the" is intended to mean "one or more" unless specifically indicated to the contrary. The use of "first", "second", "third", etc. are used to differentiate similar features and not necessarily meant to imply a sequential order.

What is claimed is:

1. A system for optical communication, comprising:
a waveguide having a semiconductor core, wherein the semiconductor core is configured to guide light along a first propagation direction; and
a coupler comprising:
a first grating,
a second grating, and
walls forming an optical cavity between the first grating and the second grating, wherein:
there is no gain medium between the first grating and the second grating,
the coupler is configured to couple light out of the waveguide along a second propagation direction, and
the second propagation direction is not parallel to the first propagation direction.

2. The system of claim 1, further comprising an optical fiber positioned to receive light along the second propagation direction.

3. The system of claim 1, wherein:
the first grating is symmetrical to the second grating, in a plane along the first propagation direction;
the first grating is a first Bragg reflector;
the second grating is a second Bragg reflector;
the optical cavity is a Fabry Perot cavity, formed between the first Bragg reflector and the second Bragg reflector;
ridges of the first grating and ridges of the second grating are elongated structures; and
the ridges of the first grating and ridges of the second grating are curved along a length of the ridges.

4. The system of claim 1, wherein:
the first grating is a first Bragg reflector;
the second grating is a second Bragg reflector; and
the optical cavity is a Fabry Perot cavity, formed between the first Bragg reflector and the second Bragg reflector.

5. The system of claim 1, wherein the coupler has etched feature sizes that are no less than 150 nm.

6. The system of claim 1, wherein the first grating is configured to have a first order diffraction along the second propagation direction and a second order reflection opposite the first propagation direction.

7. The system of claim 1, wherein the first grating has a non-uniform period.

8. The system of claim 1, wherein:
ridges of the first grating and ridges of the second grating are elongated structures; and
the ridges of the first grating and ridges of the second grating are curved along a length of the ridges.

9. The system of claim 8, wherein lengths of ridges of the first grating are longer than lengths of ridges of the second grating.

10. The system of claim 1, wherein the coupler has an optical bandwidth equal to or greater than 100 nm, measured as 1 dB optical bandwidth.

11. A method for coupling light out of an optical waveguide, the method comprising:
receiving light from a waveguide, wherein the light propagates in a first propagation direction in the waveguide;
reflecting the light, using a first grating, so that the light passes through an optical cavity wherein light passing through the optical cavity does not pass through a gain medium;
reflecting the light, using a second grating, after the light passes through the optical cavity; and
directing the light, using the first grating or the second grating, in a second propagation direction, wherein the second propagation direction is not parallel with the first propagation direction.

12. The method of claim 11, wherein:
light received from the waveguide is defined by a center wavelength, and
an average period of the first grating is equal to the center wavelength.

13. The method of claim 11, wherein directing light in the second propagation direction is based on a first order diffraction of the first grating.

14. The method of claim 11, wherein the first grating, the second grating, the optical cavity, and the waveguide are formed in a device layer of a silicon-on-insulator wafer.

15. An apparatus, comprising:
a first grating,
a second grating, and
walls forming an optical cavity between the first grating and the second grating, wherein:
there is no gain medium between the first grating and the second grating;
the first grating and the second grating are configured to diffract light, propagating parallel to a first propagation direction, to propagate in a second propagation direction and reflect light in a direction parallel to the first propagation direction;
the second propagation direction is not parallel to the first propagation direction;
diffracting light uses a first order diffraction; and
reflecting light uses a second order reflection.

16. The apparatus of claim 15, wherein:
the first grating is a first Bragg reflector;
the second grating is a second Bragg reflector; and
the optical cavity is a Fabry Perot cavity, formed between the first Bragg reflector and the second Bragg reflector.

17. The apparatus of claim 15, wherein the first grating, the second grating are part of a coupler, and the coupler has etched feature sizes that are no less than 150 nm.

18. The apparatus of claim 15, wherein the first grating and the second grating are symmetrical Bragg gratings having an equal number of periods.

19. The method of claim 11, wherein lengths of ridges of the first grating are longer than lengths of ridges of the second grating.

20. The apparatus of claim 15, wherein lengths of ridges of the first grating are longer than lengths of ridges of the second grating.

* * * * *